(12) United States Patent
Choi

(10) Patent No.: US 8,123,181 B2
(45) Date of Patent: Feb. 28, 2012

(54) VACUUM FIXER

(75) Inventor: Min-Woo Choi, Incheon-si (KR)

(73) Assignee: Good Sense, Ilsanseo-Gu, Goyang-Si, Gyunggi-Do (KR)

( * ) Notice: Subject to any disclaimer, the term of this patent is extended or adjusted under 35 U.S.C. 154(b) by 887 days.

(21) Appl. No.: 10/575,593

(22) PCT Filed: May 19, 2004

(86) PCT No.: PCT/KR2004/001191
§ 371 (c)(1),
(2), (4) Date: Dec. 30, 2009

(87) PCT Pub. No.: WO2005/035999
PCT Pub. Date: Apr. 21, 2005

(65) Prior Publication Data
US 2007/0023594 A1    Feb. 1, 2007

(30) Foreign Application Priority Data
Oct. 11, 2003 (KR) .................. 20-2003-0031990 U

(51) Int. Cl.
*A45D 42/14* (2006.01)

(52) U.S. Cl. .................................. 248/205.5; 248/205.6
(58) Field of Classification Search ............... 248/205.5, 248/206.2
See application file for complete search history.

(56) References Cited

U.S. PATENT DOCUMENTS

| | | | | |
|---|---|---|---|---|
| 4,858,976 A | * | 8/1989 | Stoll | 294/64.1 |
| 6,856,761 B2 | * | 2/2005 | Doran | 392/406 |
| 2002/0113181 A1 | * | 8/2002 | Zou | 248/205.5 |

FOREIGN PATENT DOCUMENTS

| | | | |
|---|---|---|---|
| JP | 61-109367 | | 7/1987 |
| JP | 3014841 | | 8/1995 |
| KR | 202000032150 | * | 10/2002 |
| KR | 20-0302081 | * | 1/2003 |

* cited by examiner

*Primary Examiner* — Amy Sterling
*Assistant Examiner* — Erin W Smith
(74) *Attorney, Agent, or Firm* — Lexyoume IP Group, PLLC

(57) ABSTRACT

The vacuum fixer includes a hat-shaped pressing plate made of rigid synthetic resin, a disk-type suction plate made of soft synthetic resin and covered with the pressing plate, a screw shaft mounted on the upper end of the center of the suction plate and perforating the center of the pressing plate, and a screw tightening member coupled to a protruding front end of the screw shaft.

1 Claim, 2 Drawing Sheets

[Fig. 1]
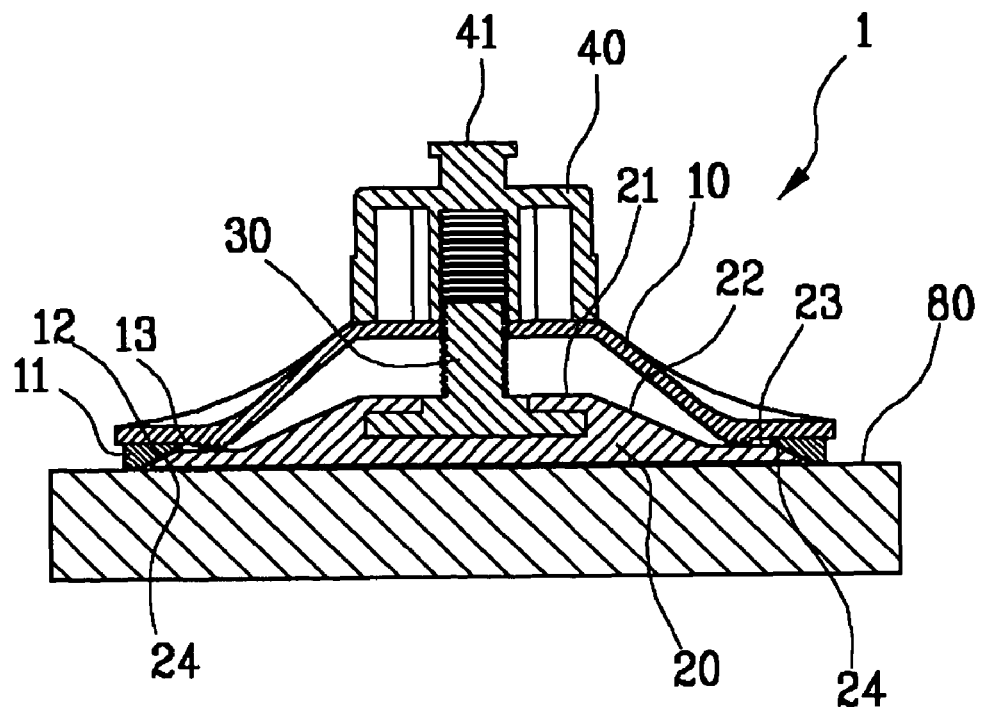
[Fig. 2]
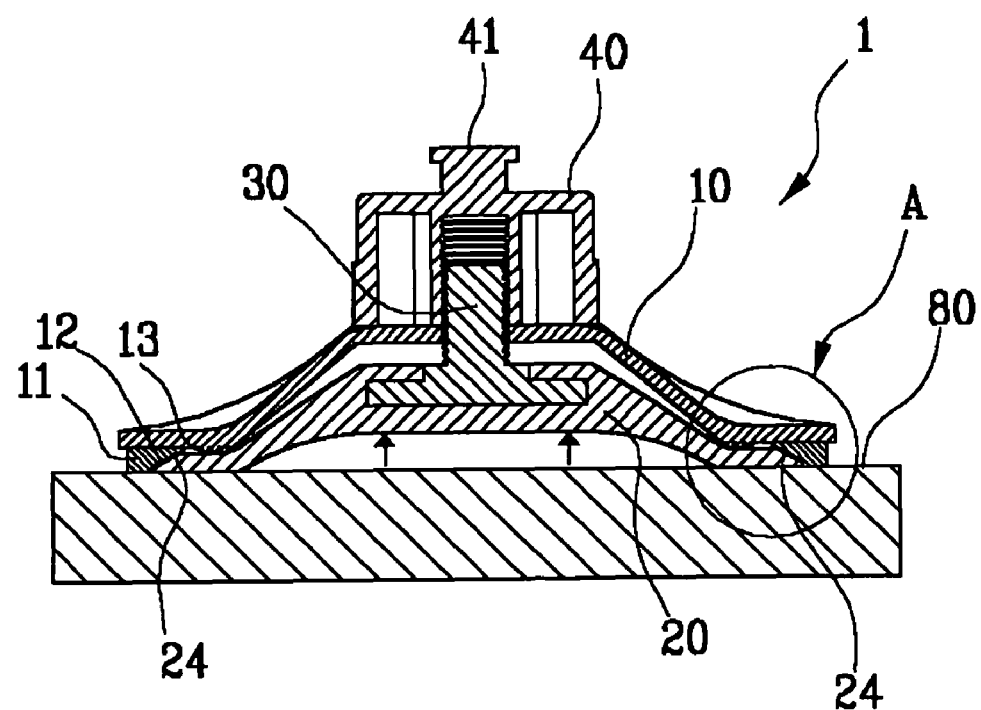

[Fig. 3]
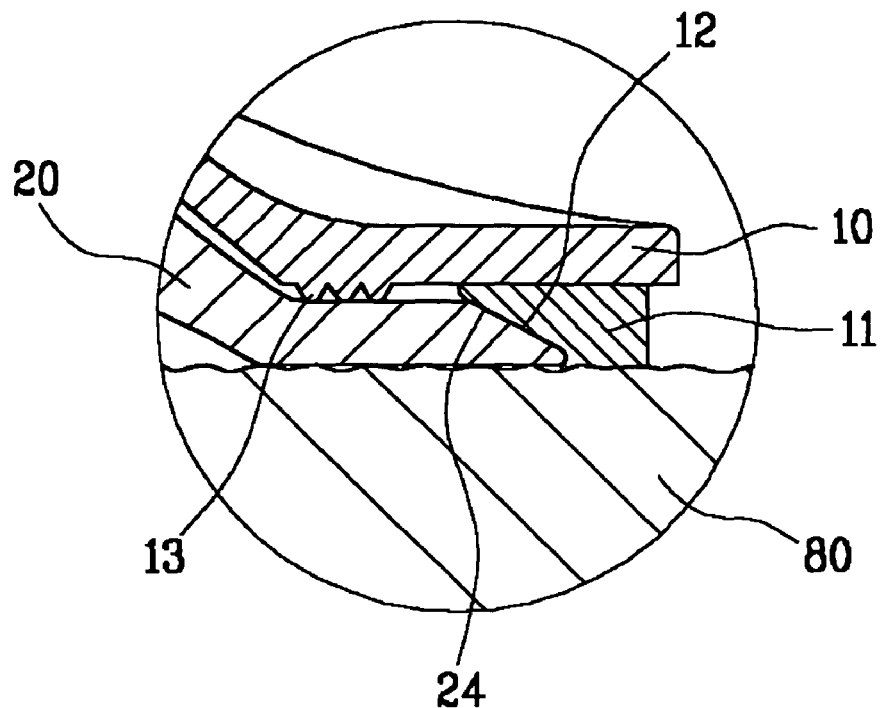
[Fig. 4]
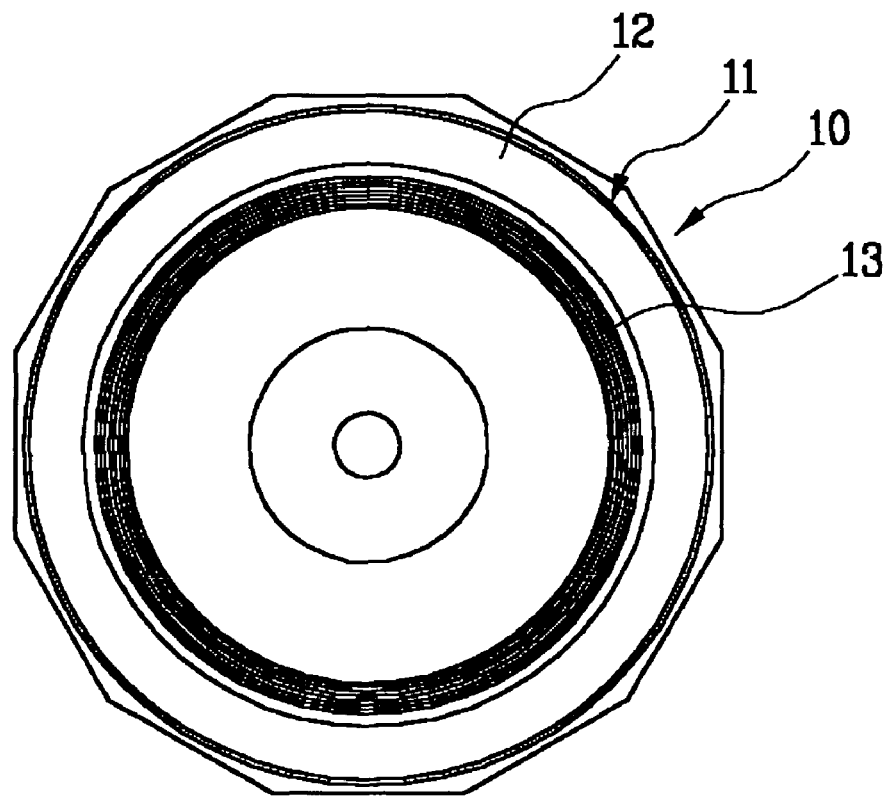

VACUUM FIXER

TECHNICAL FIELD

The present device relates to a vacuum fixer used for adhering an article on an adhered surface using internal vacuum force, and more particularly, to a vacuum fixer, which can provide excellent adsorptive power onto the adhered surface, where fine cracks or indented portions are formed, as providing a perfect vacuum state to the adhered surface by means of a gel type polyurethane vacuum wall installed on a pressing plate.

BACKGROUND ART

In general, to hang or fix some articles on a tile wall or a glass surface making it difficult to use screws or nails, vacuum fixers using the principle such as a sucker formed on legs of an octopus are widely used. Such vacuum fixer has a suction plate formed like an upside-down dish. After the suction plate is put on a smooth surface such as glass or tiles and the inside air of the suction plate is removed, when the inside volume of the suction plate is forcedly widened, the outside pressure of the suction plate, namely, atmospheric pressure, is much higher than the inside pressure of the suction plate, and thereby, the vacuum fixer can be adhered on the adhered surface since the atmospheric pressure presses the suction plate.

Japanese Utility Model Laid-Open Publication No. So61-109367, which was published on Jul. 11, 1986, discloses a vacuum fixer. In the prior art, a wide pressing plate is formed by expanding the edge of a compression fixer, which is in the form of an upside-down dish and made of rigid material, and the pressing plate is put on a suction plate nude of soft material. At this time, a diameter of the pressing plate is a little larger than that of the suction plate, and the outer circumference of the pressing plate protrudes downwardly so as to cover the suction plate. The compression fixer has a screw shaft formed on the top portion thereof to lift up the suction plate, and the screw shaft has a grip for hanging an article.

However, the conventional vacuum fixer is considerably deteriorated in adsorptive force since the suction plate is hardened when the vacuum fixer is used for a long time period. Particularly, in the case where fine cracks or indented portions are formed on the adhered surface, since the suction plate does not form a perfect vacuum wall, it may never stick to the adhered surface.

To address the above problem of the prior art, Japanese Utility Model Registration No. 3014841, which was granted on Jun. 7, 1995, discloses a vacuum fixer, which has a screw shaft mounted on the upper portion of the center of a suction plate, a dome-shaped pressing plate for inserting the screw shaft therein and covering the upper surface of the suction plate, and a grip connected to the screw shaft protruding to the upper portion of the pressing plate. Expandably adhesive material, for instance, adhesive silicon, is fused on the edge of an adsorptive surface of the suction plate using an adhesive agent.

The expandably adhesive material used for increasing bonding force of the suction plate is a good attempt. However, because the suction plate is basically made of soft material, when the center of the suction plate is lifted up toward the pressing plate to widen the inside volume of the suction plate, the form of the edge of the suction plate may be distorted or a little sliding may occur between the adsorptive surface and the adhered surface, and particularly, the prior art cannot provide a perfect bonding force if there are indented portions on the adhered surface.

Meanwhile, Korean Utility Model Registration No. 302081, which was devised by the devisor of the present device, discloses a vacuum fixer in which a vacuum wall made of gel-type polyurethane is formed on an auxiliary air compressor (called a 'pressing plate' in the present device). When the auxiliary air compressor makes the inside of a suction plate vacuum, indented portions formed on the adhered surface are filled with the gel-type vacuum wall, so that the inside of the suction plate can be kept in a perfect vacuum condition. However, the above device still has several problems in that a structure between the vacuum wall and the suction plate leave somewhat to be desired, and in that the polyurethane material used for the vacuum wall is not specified.

DISCLOSURE

Accordingly, the present device has been made in view of the above problems, and it is an object of the present device to provide a vacuum fixer, which can provide a perfect bonding force to any adhered surface because fine cracks or indented portions of the adhered surface can be completely filled with a vacuum wall mounted on a pressing plate even though there are fine cracks or indented portions on the adhered surface as much as people can or cannot see the cracks or indented portions with naked eyes.

To achieve the above object, the present device provides a vacuum fixer, which includes a hat-shaped pressing plate made of rigid synthetic resin, a disk-type suction plate made of soft synthetic resin and covered with the pressing plate, a screw shaft mounted on the upper end of the center of the suction plate and perforating the center of the pressing plate, and a screw tightening member coupled to the front end of the screw shaft, wherein the pressing plate includes a vacuum wall formed at the edge thereof in such a manner as to protrude outwardly from the bottom surface thereof toward an adhered surface, the vacuum wall being made of gel-type polyurethane which is 150~250 cps in viscosity and having an inclined compression surface directing to the center of the pressing plate, and a co-centric circular saw-toothed type contact protrusion formed on the inner surface of the pressing plate in such a manner as to be positioned at the inner portion than the vacuum wall, wherein the suction plate has a diameter smaller that the size of the vacuum wall and includes a central part, an inclined part and a circumferential part, and the circumferential part has an inclined lift surface formed on the edge thereof and overlapped to the inclined compression surface of the pressing plate, the inclined lift surface having a gradually narrowed upper portion and a gradually widened lower portion, and wherein the screw tightening member has a hanger or a grip formed on the upper end thereof.

Preferably, the vacuum wall is made of polyurethane where diol compound having a molecular weight of 4,000~6,000 is mixed with methylene-diisocyanate in the ratio of 1:8 to 1:12.

DESCRIPTION OF DRAWINGS

Further objects and advantages of the device can be more fully understood from the following detailed description taken in conjunction with the accompanying drawings in which:

FIG. 1 is a side sectional view showing a state before the present device is operated;

FIG. 2 is a side sectional view showing a state where the present device is operated;

FIG. 3 is an enlarged sectional view of an 'A' part of FIG. 2; and

FIG. 4 is a bottom view of a pressing plate according to the present device.

BEST MODE

The present device will now be described in detail in connection with preferred embodiments with reference to the accompanying drawings.

FIG. 1 is a side sectional view showing a state before the present device is operated, FIG. 2 is a side sectional view showing a state where the present device is operated, FIG. 3 is an enlarged sectional view of an 'A' part of FIG. 2, and FIG. 4 is a bottom view of a pressing plate according to the present device.

A vacuum fixer 1 according to the present device includes a hat-shaped pressing plate 10 made of rigid synthetic resin, a disk-type suction plate 20 made of soft synthetic resin and covered with the pressing plate 10, a screw shaft 30 mounted on the upper end of the center of the suction plate 20 and perforating the center of the pressing plate 10, and a screw tightening member 40 coupled to a protruding front end of the screw shaft 30.

As shown in FIG. 4, a characteristic of the present device is a vacuum wall 11 protruding outwardly from the bottom of the pressing plate 10 toward an adhered surface 80 along the edge of the pressing plate 10. The vacuum wall 11 of the present device is made of gel-type polyurethane, and preferably, a mixture where diol compound having a molecular weight of 4,000~6,000 is mixed with methylene-diisocyanate in the ratio of 1:8 to 1:12, and a viscosity of which is 150~250 cps. At this time, when polyurethane is less than 150 cps in viscosity, the vacuum fixer cannot provide sufficient vacuum effect due to a decrease of bonding force. To the contrary, when polyurethane is more than 250 cps in viscosity, bonding force is increased, but quality of the product is deteriorated since polyurethane clings to the adhered surface 80 or plasticity is not good.

The vacuum wall 11 is in the form of a right-angled triangle, which is 2.0~5.0 mm in height and 5.0~7.0 mm in base line, and has an inclined compression surface 12 directing to the center of the vacuum fixer 1. At this time, it is preferable that the ratio of the height to the base line is 1:1.5 to 1:1.8. As described above, the reason why the base line is larger than the height of the vacuum wall 11 is to maintain more perfect vacuum condition by widening a contact surface between the suction plate 20 and the adhered surface 80. The outer surface of a third part of the inclined compression surface 12 is in close contact with the adhered surface 80, and the inner surface of two third part of the inclined compression surface 12 is in close contact with an inclined lift surface 24 of the suction plate 20. Furthermore, a contact protrusion 13 is formed on the inner surface of the pressing plate 10 in such a manner as to be positioned at the inner portion than the vacuum wall 11. The contact protrusion 13 is of a co-centric circle pattern of a saw-toothed type, which is 0.5~1.5 mm in height, arranged, for instance, in two to four tracks. The contact protrusion 13 serves to closely contact the suction plate 20 to the adhered surface 80.

The suction plate 20 is in the form of a disk and made of soft synthetic resin or rubber material like typical vacuum fixers. However, the diameter of the suction plate 20 according to the present device is 2.0~5.0 mm smaller than that of the vacuum wall 11, and includes a central part 21, an inclined part 22 and a circumferential part 23 when its diameter is divided into tree parts from the center. The central part 21 is four or five times thicker than the circumferential part 23, and the inclined part 22 is an inclined surface for connecting the central part 21 and the circumferential part 23. The circumferential part has an inclined lift surface 24 formed on the outer peripheral edge thereof, and the inclined lift surface 24 has a gradually narrowed upper portion and a gradually widened lower portion.

At this time, when the diameter of the suction plate 20 is larger than that of the vacuum wall 11, the vacuum fixer cannot obtain a desired bonding force since the vacuum wall 11 is not in contact with the adhered surface 80. The central part 21 and the inclined part 22 of the suction plate 20 are contained within the pressing plate 10 in such a manner to form a predetermined space between the suction plate 20 and the pressing plate 10, the outer surface of the circumferential part 23 is in close contact with the contact protrusion 13, and the inclined lift surface 24 is overlapped with the inclined compression surface 12 of the vacuum wall 11.

The screw shaft 30 is mounted on the central part 21 of the suction plate 20, and protrudes upwardly from the pressing plate 10 after perforating the center of the pressing plate 10. The screw tightening member 40 is mounted on the protruding front end of the screw shaft 30, which protrudes outwardly from the pressing plate 10. The screw tightening member 40 has a hanger 41 formed on the upper end thereof to allow a user to directly hang an article or a hook (not shown) molded in a proper shape.

Hereinafter, the use of the present device will be described as follows.

As shown in FIG. 1, after the screw tightening member 40 is loosened, the vacuum fixer 1 of the present device contacts closely to the adhered surface 80, and the suction plate 20 is contacts closely to the adhered surface 80 when the screw tightening member 40 is pressed. After the pressing plate 10 is pressed and the vacuum wall 1 is in close contact with the adhered surface 80 maximally, the screw tightening member 40 is tightened in a state where the pressing plate 10 is pressed. Then, as shown in FIG. 2, in a state where the vacuum wall 11 and the suction plate 20 intercept introduction of the external air, the central part 21 of the suction plate 20 is lifted up inside the pressing plate 10, and a vacuum condition is formed between the suction plate 10 and the adhered surface 80. At this time, the inclined lift surface 24 of the suction plate 20 is slid up along the inclined compression surface 12 of the vacuum wall 11, and then, the suction plate 20 is in close contact with the adhered surface 80 without distortion while the inclined part 22 and the circumferential part 23 are extended somewhat. When the vacuum condition is formed by the above process, the vacuum wall 11 and the suction plate 20 are in closer contact with the adhered surface 80 by vacuum force, and the inclined compression surface 12 of the vacuum wall 11 contacts the inclined lift surface 24 of the suction plate 20 firmly. As shown in FIG. 3, even though the adhered surface 80 has several indented portions, the perfect vacuum condition can be maintained as the indented portions of the adhered surface 80 are filled with the vacuum wall 11.

The pressing plate 10 and the suction plate 20 may be one of a round, a rectangle, a pentagon, a hexagon, and others, and particularly, the pressing plate 10 may be manufactured in the form of a flower, a trumpet, or other characters according to consumers' taste.

In addition, the screw tightening member 40 nay have a round or hooked grip (not shown) in place of the hanger 41 mounted on the upper end thereof, or the upper end of the screw tightening member 40 nay have any proper form, if necessary.

INDUSTRIAL APPLICABILITY

As described above, the vacuum fixer according to the present device can provide a perfect bonding force to any adhered surface because fine cracks or indented portions of the adhered surface can be completely filled with a vacuum wall mounted on a pressing plate even though there are fine cracks or indented portions on the adhered surface as much as people can or cannot see the cracks or indented portions with naked eyes. Therefore, the present device can be used in houses, offices, schools, the outer surfaces of buildings, industrial sites, or other places in various ways.

While the present device has been described with reference to the particular illustrative embodiment, it is not to be restricted by the embodiment but only by the appended claims. It is to be appreciated that those skilled in the art can change or modify the embodiment without departing from the scope and spirit of the present device.

The invention claimed is:
1. A vacuum fixer comprising:
a pressing plate that is made of a first material, the pressing plate having an exterior surface and an interior surface;
a suction plate that is made of a second material that is softer than the first material, and that has an exterior surface and an interior surface, wherein (a) the exterior surface of the suction plate faces the interior surface of the pressing plate and (b) the interior surface of the suction plate is configured to be adhered to an adhered surface;
a vacuum wall made of a third material that is different than the first and second materials, wherein the vacuum wall (a) is coupled to the interior surface of the pressing plate, (b) has a foot portion that is configured to be adhered to the adhered surface in a circumferential area that surrounds the suction plate, and (c) has a triangle portion that is wedged between the interior surface of the pressing plate and the exterior surface suction plate; and
a plurality of saw-toothed type contact protrusions that extend from the interior surface of the pressing plate and that engage the exterior surface of the suction plate.

* * * * *